United States Patent

[11] 3,610,652

| [72] | Inventor | John Russel Crompton Moore<br>Little Melton, Norfolk, England |
|---|---|---|
| [21] | Appl. No. | 315 |
| [22] | Filed | Jan. 2, 1970 |
| [45] | Patented | Oct. 5, 1971 |
| [32] | Priority | Jan. 3, 1969 |
| [33] | | Great Britain |
| [31] | | 620/69 |

[54] SUSPENSION SYSTEMS
30 Claims, 21 Drawing Figs.

| [52] | U.S. Cl. | 280/80, 152/17 |
|---|---|---|
| [51] | Int. Cl. | B60b 9/00 |
| [50] | Field of Search | 152/80, 85, 86, 17, 69, 70; 301/136; 280/124 A, 80 |

[56] References Cited
UNITED STATES PATENTS

| 1,158,422 | 11/1915 | Alton | 152/80 |
| 1,166,697 | 1/1916 | Likely | 152/69 X |
| 1,349,019 | 8/1920 | Timberlake | 152/80 |
| 1,970,823 | 8/1934 | Suczek | 280/124 A X |

*Primary Examiner*—Richard J. Johnson
*Attorney*—Waters, Roditi, Schwartz & Nissen

ABSTRACT: A suspension system having a suspension wheel in which the rim and hub are joined by compliant means such as V-form sheet material or freely or resiliently hinged spokes, the rim being coupled by a bearing to control means such as a pivoted link, a Watts mechanism or a cycloid mechanism to restrain rim movement to a predetermined path and said bearing also being able to transmit to the rim suspension springing and damping which bypasses the wheel hub.

PATENTED OCT 5 1971 3,610,652

SUSPENSION SYSTEMS

The invention is primarily concerned with the suspension of wheeled vehicles particularly automotive vehicles, military vehicles and tanks, aircraft landing wheels, rolling stock, servicing equipment for airfields, industry, hospitals and the like, and in its simpler forms with the suspension of bicycles and other lightweight wheeled apparatus. It also has engineering applications in the field of flexible or offset coupling devices including self-tensioning and sprocket drives and antibacklash gearing.

The suspension of automotive vehicles has in the course of some 70 years become more deeply integrated with overall vehicle design and also become more refined with increasing knowledge and experience. It is thus no longer possible to introduce substantial advances without far reaching considerations. The art nevertheless remains a compromise and the more usual object is to achieve optimum balance between technical ideals, practical performance and construction economies. Many configurations have been evolved, all of which have well-known advantages and disadvantages.

It is convenient here to consider briefly to what extent the orthodox suspensions influence a complete modern vehicle, taking for purposes of illustration a simple but characteristic private family motorcar with a forward engine driving the rear wheels through a propeller-shaft and back axle together with front suspension by wishbones and coil springs.

The components required in this basic suspension layout, excluding springs, dampers and their anchorages, include upper and lower wishbones, trackrod articulations, flexible hydraulic connectors, transmission universal joints, Panhard rod, reaction links and various bearings. Constructors often purchase several or all such parts from proprietory sources but provide the tooling, labor, incidental materials and factory facilities required for assembly and inspection. Constructors also have to integrate all proper allowances for the vertical displacement of these components, including such other components as back axle and propeller shaft. The car structure must be cut back accordingly to accommodate these parts as well as the hydraulic and fuel lines, wiring, exhaust piping routed round clear of vertical motions. Reinforcement must also be introduced to minimize the loss of strength so entailed.

Thus, the provisions necessary to clear suspension motions cut into passenger space and commonly prejudice rear seat angles, leg room, transmission tunnel dimensions, boot size and shape, headroom, spare wheel stowage, fuel tank capacity and shape, exhaust runs, rear styling, floor levels in estate cars, trucks and lorries and door-opening areas.

Thus, orthodox suspensions, even of simple type, cost very much more than the bare springs, dampers and links necessary to wheel deflection and control for many direct and indirect reasons, all of which are adverse to the user not only in the total cost increase but also in reduced standards of utility and accommodation.

The invention involves the use of a suspension wheel, i.e., a wheel with relative movement between its hub and rim, which may be combined with control provisions in order to eliminate many orthodox underbody components and structural cutbacks for vertical motions.

Previous suspension wheel proposals provide spring compliance in the form of mechanically resilient means between rim and hub. There have also been other proposals, including spring hubs, pneumatic means between rim and hub and rubber membranes across the rim in conjunction with slideable rubber diaphragms disposed radially. No examples so known have sufficient range of useable deflection and transverse stiffness to fulfil the requirements of a high-speed automobile, typically because the resilient means were provided to support the vehicle and thus provide its suspension springing. Even if any such wheel of sufficient range had in fact been imagined, it would probably not have been put forward as a useful suspension device on four grounds.

1. Any suspension wheel of given diametral range of deflection can only be utilized for bump deflection over one half of its range, i.e., its radial range. In practice, vehicle deadweight is liable to absorb about 50 percent of this remaining range, leaving some 25 percent available for payload and bump deflection. But payload may itself absorb 10 percent or more, leaving 15 percent or less as the bump-condition service range, a figure that would often be less than 1 inch in practice. The springs could be stiffened up to produce a harsh ride but still leave an unacceptable range. 2. The suspension of any steerable wheel must operate in such manner that castor angle settings are maintained within close tolerance at all deflections. Under accelerative and decelerative forces the entire range of a suspension wheel can appear in the horizontal plane thus totally invalidating castor angle tolerances and resulting in gross instability. 3. Where such a wheel comprises a hub, a rim and resilient means therebetween, a sudden suspension deflection at high speed could initiate a condition in which the deflected part of the rim begins to revolve as an out of balance mass. Such imbalance would immediately generate destructive forces. 4. It would not be seen to the designers that the rim could be damped by practical methods. The same difficulties effectively preclude such ride-control provisions as antiroll coupling.

In summary, the reasons why prior art proposals suffered from such serious deficiencies can in most cases be traced to two main causes. 1. The adoption of resilient means within the wheel as the sole or major means of conveying gravitational burden to the road while also acting as sole or major suspension restraint. 2. Following from the first reason, lack of provision for oscillation control, roll control, bump-recoil ratio control, and control over danger of catastrophic imbalance. There is also the problem that whereas no known examples have sufficient range to meet modern needs, their alternative use as supplementary additions to orthodox suspension systems has never found substantial justification.

It is an object of this invention to provide a suspension wheel system in which, whether having a wheel which itself is resilient or not, effective control of the wheel is possible. Some embodiments of the invention are proposed specifically to enable performance in terms of unsprung weight, tire wear, road holding, comfort and cornering power to be improved and to provide vehicle designers with new prospects of producing vehicles having more room for a given size, reduced complication, greater strength and less hindrance to the optimum disposal of internal passenger and service provisions.

The invention may, in other forms, be applied to rotatable structures such as gears, for example to reduce backlash and for tensioning sprocket and pulley drives. Thus, the term "wheel" used herein is to be construed as referring to such rotatable structures in addition to automobile and other vehicle and road engaging wheels.

According to the present invention, there is provided a suspension system having a wheel in which the hub and rim are joined in a torque-transmissible manner by compliant means permitting relative movement between the hub and rim radially of the wheel and control means coupled to the rim to constrain said relative movement to a predetermined path, said control means including bearing means to permit rim and hub rotation.

According to the concept inherent in the invention, all conventional ride control features, such as damping, springing and antiroll, can now be related to the rim via a bearing. A suspension spring can thus be coupled to the rim to give a support opposing vehicle weight and payload whereby, under static loading, the hub can be at a predetermined position, even coaxial, with respect to the rim. Thus, merely by appropriate spring design, and predetermined portion of the diametrical range of deflection of the wheel can be allocated to bump deflection and the remainder to recoil deflection.

The structure of prior suspension wheels, in particular the incorporation of load-supporting resilience between rim and hub, precluded an adequate diametrical range of deflection in combination with a substantial rigidity transversely to prevent appreciable skewing and lateral displacement of the hub relative to the rim. By virtue of the invention, there need now be no limit to this range, apart from that imposed by the physical limitations upon the size of wheel and vehicle. Indeed, it is preferred in the invention that the diametrical range be at least 20 to 25percent of the effective outer diameter of the compliant means or of the inner diameter of whatever the periphery of the compliant means are secured to, be it the rim or means attached to the rim.

The manner in which the wheel may be implemented will now be considered, with reference in the first instance to a resilient wheel, i.e. a wheel with resilience between its hub and rim.

In one form, the hub and rim are joined by a plurality of separate spoke structures, each being secured to the hub, or a part attached thereto, and to the rim, or a part attached thereto, and having portions of sheet material the width dimensions of which extend transversely of the hub and rim and which portions are connected by an angled bend or junction extending transversely of the hub and rim, the spoke structures being such as to permit relative movement between the hub and rim radially of the device.

Preferably, said portions are substantially straight. Each spoke structure may be a single piece of sheet material, such as cold-rolled sheet steel or spring steel, bent, molded or otherwise formed to the desired configuration or may be made from two or more pieces joined together, as by welding, riveting, bolting or other means.

The material may be shaped in section or width or in combination if it is desired to modify the resilient characteristics of a spoke structure along its length. It is often preferable to provide greater resilience to the end of a spoke where it approaches the point at which it is fixed to the rim or wheel part in association therewith than to its other end for purposes of properly distributing the torque transmitted by a wheel along the spoke structures.

The spoke structures need not be secured by and include any rotating or slidable parts, thereby to avoid friction. Thus, said relative movement may arise solely by virtue of resilience in the sheet material.

Such a spoke structure is based upon the realization that transverse stiffness is important, in order to minimize relative axial movement of the hub and rim and skewing of the hub and rim axes.

The transverse stiffness of sheet material is increased by the angular discontinuity as already described. It may be further increased by transverse ribs formed for example by embossing the sheet material or by molding. Indeed, transverse stiffness in the vicinity of sharply defined bends, angles or ribs across the width of sheet material may approach that resulting from rigidly fixing an end of sheet material to a rigid surface. For the same reason, the width dimension of the sheet material portions should be as large as possible, preferably at least approaching the length dimension of the portions. For example, the width dimension may be at least one-half of the length dimension.

Furthermore, it appears that sheet material which is substantially straight in its unstressed state has less tendency to buckle under transverse load than precurved material. Accordingly, it is preferred that said sheet material portions are substantially straight. However, the portions are not bound to be precisely straight in the unstressed state. For example, to combat centrifugal deflection some spoke structures or portions might be slightly curved in their unstressed state, and there may be other marginal deformities.

In applications requiring appreciable strength, the sheet material could be of spring steel for example, but in other applications, as for perambulators, weaker materials are feasible such as synthetic resins.

One example, such a wheel has its hub and a rim joined by a plurality of sheet material spokes each of V-shape and each secured at one end region rigidly relative to the hub and at the other end region rigidly relative to the rim.

The diametral deflection range of wheels in accordance with this and other proposed constructions may conveniently be expressed as a function of the effective outside dimension of the compliant means or of the inside rim diameter to which they are fixed or, if fixed to other members in association with the rim, the effective diameter of such fixings, ans in these terms said range may extend up to the order of 30 percent or thereabouts. Where it is desired to obtain the maximum possible range for a given outside tire diameter, clearly it will assist the designer to take advantage of low-profile tires and large rim diameters where commercial availability exists.

In the case of very narrow wheels or wheels in which it is desired to stack large numbers of thin spoke structures an alternative spoke configuration is proposed to provide high orders of transverse stiffness in width-constricted conditions.

In this modification each spoke is made of one or more pieces of sheet material to provide a first, substantially straight, portion which is secured rigidly to and extends from the hub, or a part attached thereto, and a further portion connected chordwise to the rim and formed so that it is resilient chordwise, for example by means of a bend or loop formed in it. The first portion is joined to the further portion intermediate the ends of the further portion to provide an angled junction.

In the resilient wheel configurations described, rim and hub materials may be conventional and they call for no further comment. Spring steel, preferably corrosion resistant, is clearly suitable as a spoke material. Composites such as reinforced plastics are possible and it is thought that glass fiber reinforced resins will provide a favorable spoke material for several applications, and that carbon-fiber reinforced high-duty composites will be attractive for specialized applications. Simpler applications, such as bicycles, can be met by molding processes for the complete wheel with hub, spokes and rim using inserts where necessary, e.g. for bearing bores.

It should here be observed that, as will be clarified later, the resilient spoke structures in the total configuration do not necessarily bear loads, and in the full suspension case these loads can be wholly or largely supported by other means. The primary design function of compliant means, such as the spokes, is to convey torque from rim to hub and vice versa, and to maintain the proper spatial relationship, parallelism and freedom from skewing of hub and rim axes, thereby transmitting transverse loadings between vehicle and road.

Mention has been made of spoke gauge shaping and width shaping for purposes of modifying spoke resilience characteristics, and these may be also or further modified by the addition of hinge means between spoke structures and their anchorages or between spoke portions. Such hinges may be of greater resilience of flexibiltiy than the spoke portions to reduce spoke resilience of to increase overall resilience for example, and may take the form of single or laminated sheet-connecting strips. Alternatively, hinge pivot means of special construction to be described herein may be used.

The invention may also be implemented as to its wheel by a conformable construction using free-jointed spokes without incorporating resilient means, and such a construction will now be considered.

The configuration is such that a pair of links are hinged together to form a spoke structure adopting a similar position and configuration to that of a V-shaped resilient spoke structure as previously described.

Each part of a spoke structure may be, for example, of rectangular plan shape and provided with pivotal axes along two opposite edges. A triangular or L-shaped spoke is, however, preferred having a hinge axis along or about one side and a relatively narrow pivot bearing parallel to said hinge axis and disposed at the apex. In most cases, this shape may provide a lighter spoke for a given stiffness. Very light and stiff spoke parts may be fabricated from tubular sections, but spoke parts may also be stamped from sheet metal, molded, forged or cut from extruded sections.

Coming now to the control means, these means in automotive systems limit said relative movement to a path, such as an arcuate or rectilinear path, which is substantially vertical.

The control means may comprise a first member, such as a disc or spider, coupled to the rim either fixedly or through bearing means, said first member being coupled to a further member defining the path of relative movement. The further member may be coupled to any desired damping device, load supporting spring, antiroll control means and the like. The further member might be a hinged bracket, a leading or trailing link or a linear motion device, such as a linkage of the Watts linear motion-type or a cycloid arrangement. Such a linear motion device may be accommodated wholly within the space defined by the rim.

Preferably, the first member is fixedly secured relative to the rim and is coupled to the further member by a bearing coaxial with the rim.

Thus, a practical embodiment may be devised, for automobile use for example, in which rim displacements due to road irregularities, braking and acceleration are controlled and the system maintains proper camber, castor, rake, trail and tracking adjustments. Thus, as already indicated, one may provide means for oscillation damping, antiroll or ride-control pickoff, all of which are important for modern vehicles.

For a better understanding of the invention and to show how the same may be carried into effect, reference will now be made, by way of example, to the accompanying drawings, in which.

Figure 1:
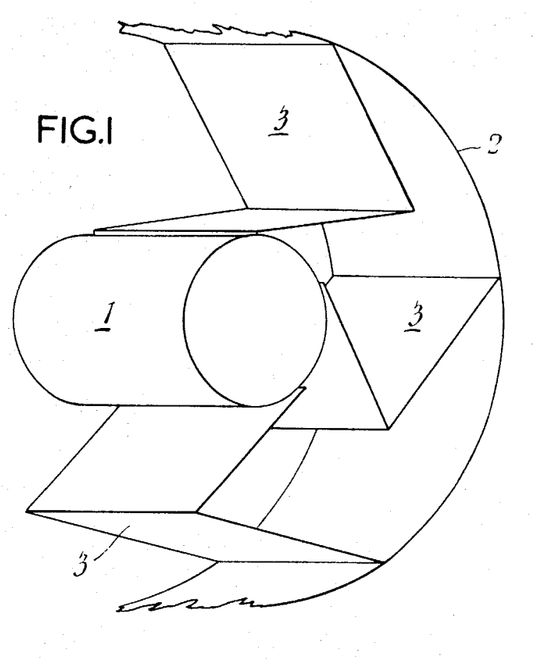
FIG. 1 is a diagrammatic representation of a first embodiment of resilient wheel.
Figure 2:
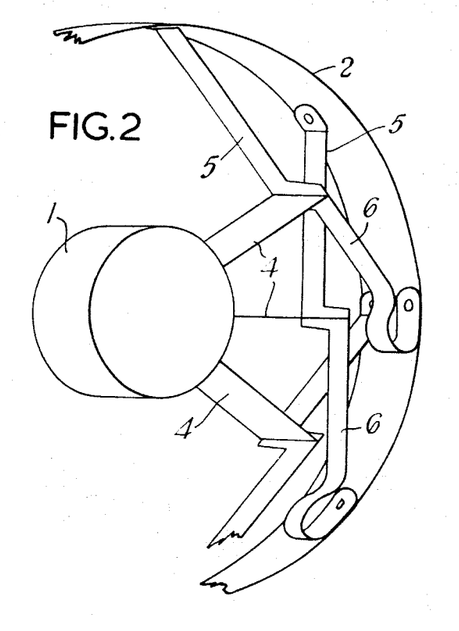
FIG. 2 shows a second embodiment of resilient wheel.

As an introduction to the structures illustrated in FIGS. 1 and 2 the resilient properties of sheet material will firstly be considered.

If a plurality of identical straight flat strips of thin resilient material such as spring steel are fixed vertically and parallel by one end to the upper surface of a horizontal plate in such a manner that their centerlines are in a common plane and their upper ends are in turn fixed to the underside of a further plate parallel to the first plate, said plates are free to move relative to each other in said common plane but resist lateral forces parallel to the width dimensions of the strips. Also, the torsional freedom of individual strips is inhibited by the other strips. Consider now a construction built from strips each of which is bent at an angle, for example 90°, along a line at right angles to its length, for example at the midpoint. Now, in addition to the resistance and resilience previously noted, said plates also have relative resilience towards and away from each other, without relative motion parallel to the plates. Provided the individual strips are of substantial width relative to their total length, the buckling resistance to lateral forces will remain high even when straight portions of the strips become curved as a result of loading.

If the plates described are now curved to form one a large and the other a small cylinder, said strips then perform the function of spokes which have resilience in the diametral plane of the cylinders and a resilient wheel or like device is accordingly obtained. The cylinders are free to move relative to each other in directions at right angles to the axes of the cylinders, but the spokes resist lateral forces, so that the axes of the cylinders are maintained substantially parallel. A resilient wheel of substantial range without bearings or other slidable components with a high resistance to lateral deflection is thereby provided.

FIG. 1 of the drawings shows such a construction in which a wheel hub 1 and the inner surface of a rim 2 are joined together by spokes 3 of spring steel sheet or other resilient material, each spoke being bent to provide two substantially straight portions joined at an angle or each being fabricated from two substantially straight parts joined together at an angle.

An alternative configuration which it is thought will be particularly advantageous for wheels which are narrow in relation to their rim diameters, such as motor bicycle wheels, will now be described with reference to FIG. 2.

In narrow wheels, the width of each spoke is restricted and its lateral resistance reduced. Lateral stiffness may be increased by increasing the number of spokes and/or by supporting each spoke at some point along its length without resorting to unfavorable spoke sections. The spokes could be stiffened if the outer, or rim-side, portion of each could be continued across the wheel in the form of a chord. The use of a simple chordal form of spoke is not desirable however because the chord would be taut across the included arc of the rim, thus inhibiting radial resilience where it is joined to the hub portion of the spoke and the chords would overlap and conflict unless the number of spokes were greatly diminished instead of increased. It is proposed to overcome both of these difficulties by the use of substantially straight spoke portions extending from the hub and which are fixed along their outmost edges to a point along the length of spoke sections disposed substantially chordwise and of crossover construction (that is to say, the chordwise spoke portions at opposite sides of the junction are staggered about their mean centerline). One or both end regions of the chordwise section is or are provided with means of compliance in order to confer resilience in the radial plane of the wheel at the position where they are attached to the radiating spoke portions.

Referring to FIG. 2 of the drawings which illustrates diagrammatically a wheel cut away to reveal the spoke arrangement described, it will be seen that a hub 1 and a rim 2 are disposed concentrically. Straight or relatively straight spoke portions 4 extend outwardly from hub 1, the outer ends of these portions 4 being joined to the crossover point of spoke sections disposed in a chordal position and each of which may be considered as consisting of two portions 5 and 6 on opposite sides of said crossover region. In the example illustrated, a bend or open loop at one end of the complete spoke gives lengthwise resilience sufficient to confer radial resilience to the crossover point and is formed at the rim end of portions 6. The arrangement is such that all the portions 6 between rim and crossover lie at one side of the wheel and all other portions 5 lie at the other side, thereby permitting close stacking of a large number of overlapping spoke sections without fouling.

A projected form of such resilient wheels comprises a hub and resilient spoke system as described, but in which the outer spoke ends are attached directly to or are molded into a, possibly reinforced, solid or pneumatic tire. A particular advantage of such an application when the tire and wheel are manufactured integrally without an orthodox rim is that there is a longer contact-patch between tire tread and road thereby improving water penetration and traction.

In another form, the wheel is as previously described, but the whole is impregnated with rubber or comparable synthetic elastic compound in such manner that the wheel structure and spokes form a matrix therein. It is thought that such a wheel would have industrial and agricultural applications.

Figures 6, 8, 11, 13:
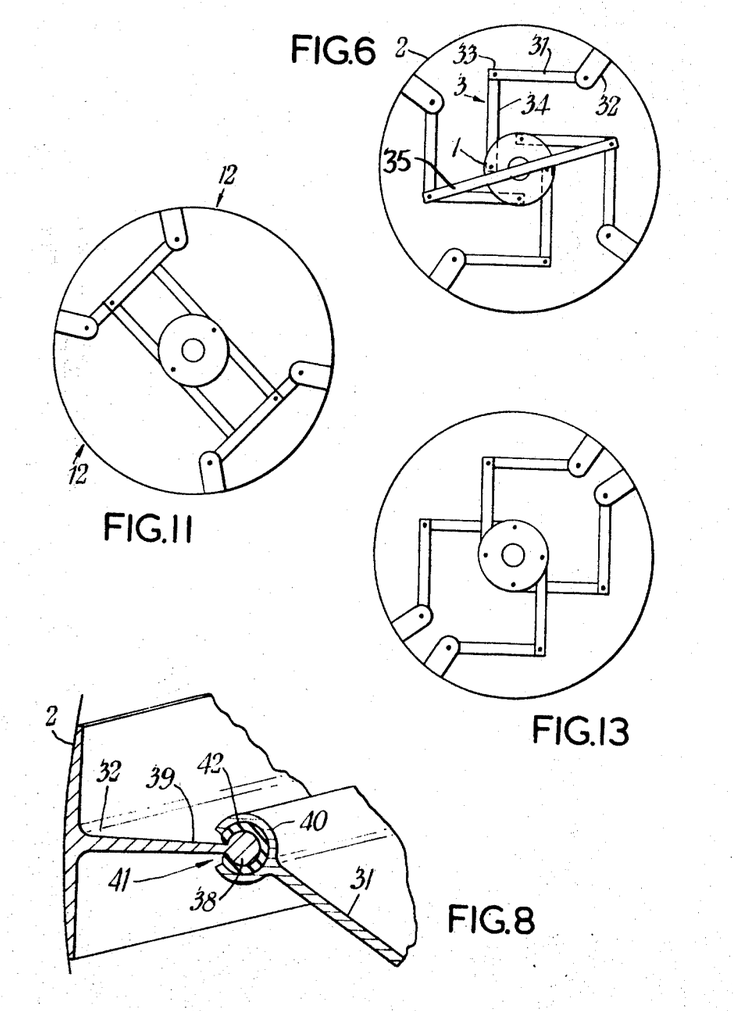
FIG. 6 is a diagrammatic representation of an alternative form of wheel.
FIG. 8 shows a joint which may be applied to the wheel of FIG. 6.
FIGS. 11 and 13 diagrammatically show two further forms of wheel.

In another example the spokes are formed of pivotally joined substantially rigid spoke parts disposed in swastika formation, as shown in FIG. 6. Assuming triangular or L-shaped spoke parts (see FIG. 12 for example), each spoke comprises one part 31 hinged continuously along one edge or provided with well spaced pivot bearings therealong to the wheel rim 2 or part 32 attached thereto. The narrow or knuckle baring 33 thereof cooperates with the narrower bearing of a further triangular or L-shaped spoke part 34 the opposite edge of which is hinged or pivoted by well spaced bearings to the hub 1 or a part attached thereto. The knuckle bearings must have thrust as well as journal capacity, and the construction proposed provides excellent rim to hub transverse resistance and a radial displacement range comparable to that obtainable from the resilient construction with V-form spokes previously set forth.

Such a construction alone does not transmit torque, as all joints are free. Torque will be transmitted by such spoke pairs as are provided with a tie link coupling them at or about their knuckle bearings. Such a tie link 35 has been added to FIG. 6 to illustrate a diagrammatic application.

If the knuckle joints of one pair of diametrically opposed spokes 3 in a free-jointed link-spoke wheel are held together, such as by the tie link 35, the distance between the remaining pair of knuckle joints will alter with changes in wheel deflection because the remaining spoke parts describe arcs about their hinge points during deflection. If more than one pair of spoke knuckle joints are rigidly tied, therefore, radial deflection in most angular directions will be blocked by conflict of motion.

Torque may therefore be transmitted through one pair of spokes in a wheel that are rigidly tied, and in fact an entirely practical suspension wheel with good transverse resistance may thereby be provided, but if additional spoke pairs are added to brace the wheel they should not be rigidly tied.

As arcuate motion in the links implies, the use of one rigid tie link produces cyclic irregularity in the drive when the wheel is deflected away from the neutral position. It is also implied that angular changes will take place between rim and hub during deflectional changes. However, suspension deflections are not in general of very high velocity, and even under shock conditions a wheel may often take several milliseconds to reach full deflection due to inertia and tire resilience.

As the angular variation between rim and hub during positive and negative suspension excursions has the same rotational sense, the mean effective angular variation for a complete diametral deflection is reduced and typically may be about plus or minus 3.5°. This is even within the transmission resilience capacity of several present vehicle designs, particularly as extreme range suspension deflections are transient conditions.

The symmetrical disposition of more than one tie link is possibly a preferably arrangement, such being made possible by the use of lengthwise resilient tie links which will now be considered.

Figure 7:
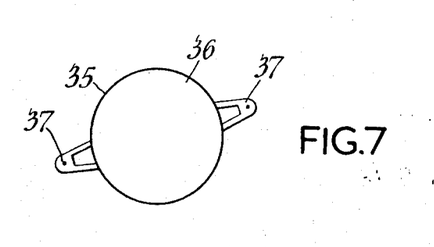
FIG. 7 shows a tie link suitable for the wheel of FIG. 6.

A resilient tie link 35 may be of very simple form, such as the example illustrated diagrammatically in FIG. 7 which comprises an elastic steel ring 36 to which is fixed diametrically opposed pivotal means 37 of center distance compatible with the knuckle bearing mean center distance of the spoke pair to be coupled.

Where on pair of spokes only is coupled by a resilient tie link, the disadvantageous effects previously referred to are cushioned and rendered less objectionable.

The more favorable application, however, is the symmetrical coupling together of all spoke pairs in a wheel system, by which means the torque through a wheel is distributed among and balanced between the separate spokes. In this case a tie link with a lengthwise resilient compliance of typically about 1.5 to 2.0 percent in either direction relative to unstressed length may be sufficient.

Ring-form tie links may readily be of rigid construction, and the ring-form pattern is in fact preferred for both resilient and rigid tie links because wheel spokes may easily be designed to provide space into which such ring-form tie links may be accommodated without fouling throughout the deflection range.

Free-jointed spoke wheels entail the use of friction bearings. However, the position is somewhat protected by the rim and in some configurations also a disc, and needle roller cartridge elements are preferred where the duty is high. As, however, the rubbing velocity is low it is thought that molybdenum disulfide impregnated polytetrafluorethylene surface treated bushes or proprietory bushes using comparable materials will prove suitable for most applications. The position is one in which oilless techniques are preferable, and these have shown themselves to be weather resistant.

The wheel may alternatively be of resiliently jointed construction, that is to say of link and bearing spoke design as last described but incorporating resilient means by the use of elastic bearings.

Referring again to FIG. 6 the same configuration may be used, the free-jointed bearings being discarded in favor of rubber bush bearings of clamped or bonded construction. Such bearings are fitted in the unstressed condition, that to say when they exhibit no torque between core and shell, and when rim and hub are coaxial and spoke angles are symmetrical, or to the wheel parts when they are in the positions assumed after assembly. in such manner that unloaded wheels are maintained in their neural and coaxial condition by the bushes.

One form of resilient bearing may use a plurality of small diameter short bushes which are coaxial, each secured as to its outer diameter in cooperating spoke ends alternately distributed so that every other bush is locked in the end of a given spoke part which accordingly interlock in the manner of hardware or piano hinges. The several bores are then clamped by a single centerpin the loading in which is well distributed. The angular range requirement of each bush is halved because effectively each bush is in series with another and the centerpin assumes a means angular position. Such an arrangement also provides excellent lateral strength.

An alternative resilient bearing will now be described with reference to FIG. 8 of the drawings, the object of which is to provide long but relatively narrow bearing means of resilient type. This comprises a cylindrical or male part 38 supported continuously by a neck 39 along its length and a cooperating hollow cylindrical or female part 40 open along one side by a slot 41 traversing its length and of a width determined by the angular travel requirements of the joint. The male part is placed coaxially within the female part in such manner that the neck 15 projects through the slot 41 and rubber 42, such as a synthetic material, is molded into the annular cavity. Alternatively, a slit rubber tube is drawn into the cavity and bonded to the surfaces therein, thus forming a bush bearing operable through an arc and which is not limited as to length by core distortion under load since the core is continuously supported throughout.

Referring again to FIG. 8, no distinction need be made as to whether male or female parts are to be used in any specific position, and in this sense the configuration shown may be reversed, but it is advantageous having regard to the prevailing torque and centrifugal loading to so dispose and orientate the inner and outer parts that the rubber tends to be centralized rather than compressed towards the slot 17, i.e. so that the male part tends to be urged into the female part.

The rim mounted bearing parts and the bearing ends of spokes, including where required complete spoke portions with integral bearing members at each end, may be fabricated, cast, molded, sintered, pressed or the like of many materials, but it is clear that the requirements are particularly favorable to the use of extruded sections which may simply be cut into the required lengths and shaped at their ends as may be necessary. Further, by designing several wheel models in a range to accept the same extrusion sections, costs could be reduced.

Figures 9, 10, 16, 17:
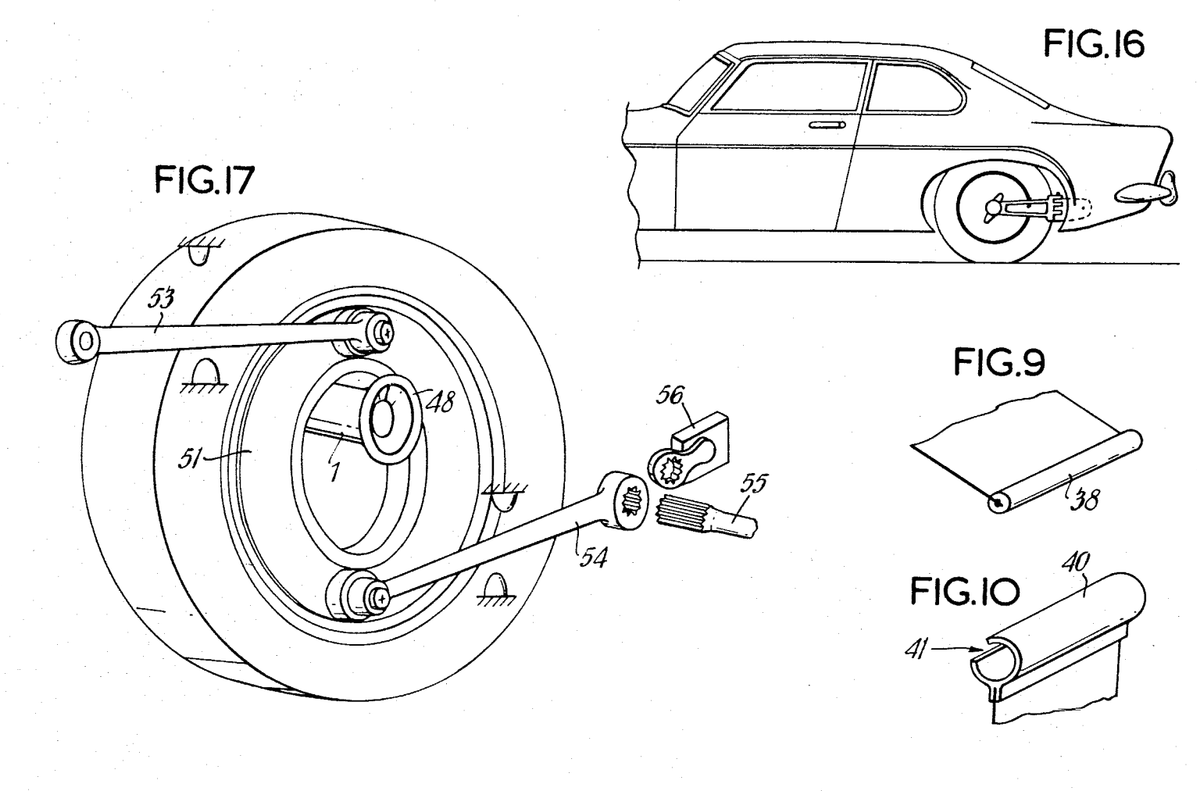
FIGS. 9 and 10 show a joint which may be applied to the wheel shown in FIG. 1.
FIG. 16 shows an automobile with an outboard leading link control.
FIG. 17 shows the wheel of FIGS. 14 and 15 with leading and trailing links.

Such bearings may also be used where hinges are required to modify resilient wheel spoke characteristics and examples of suitable resilient spoke treatment are shown in FIGS. 9 and 10. The spoke fitments indicated are also very appropriate to extrusion processes.

It is thought that resilient rubber bearings as shown in FIG. 9 may significantly reduce the transmission of road vibrations falling within the audio spectrum thus providing quieter conditions within vehicles.

Figure 12:
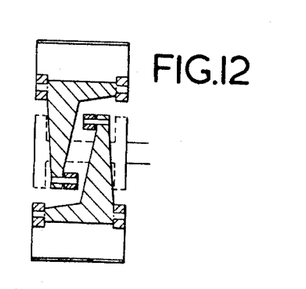
FIG. 12 is a section on the line 12—12 of FIG. 11.

The construction described in relation to FIGS. 8, 9 and 10 is proposed for rim end and hub end spoke bearings and the knuckle bearings of such spokes as may be required to have long bearings in said positions, but for the narrow end of triangular or L-form spoke parts a clamped form of tapered rubber bush giving axial stiffness over a relatively short bearing length is preferred, and such bearings are of known construction.

Where short spoke sections are used over large angular ranges and such ranges exceed the capacity of rubber bushes of reasonable proportions, a series arrangement of such bearings may be used to cover the needs at any pivotal position or zone, each such bearing or axially disposed array sharing the total angular displacement.

Where it is intended to use resiliently jointed wheels without tie links, it will be realized that spokes disposed in the pattern shown in FIG. 6 may be subject to some centrifugal displacement, and such displacement may be enough to diminish significantly the wheel displacement range. This condition will not arise if two parallel sets of spokes are used, each reversed as to rotational direction. However, a simpler and more economical alternative is to employ inherently balanced spoke configurations which are symmetrical as to centrifugal loading and therefore do not lose range. Diagrammatic examples are illustrated in FIGS. 11 and 13 and other such arrangements are possible and convenient. Triangular or L-form spoke parts are preferred in these cases because they lend themselves so readily to overlapping knuckle joints, and an example of the manner in which they may be disposed and formed is indicated in FIG. 12 which is a sectional view of FIG. 11 through a line defined by the arrows 12—12.

Figure 14:
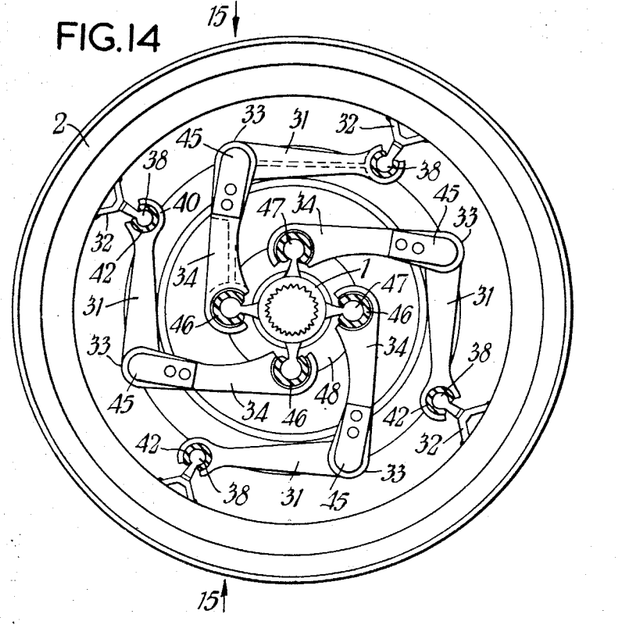
FIG. 14 is a side view of a wheel constructed according to FIGS. 6, 7 and 8.
Figure 15:
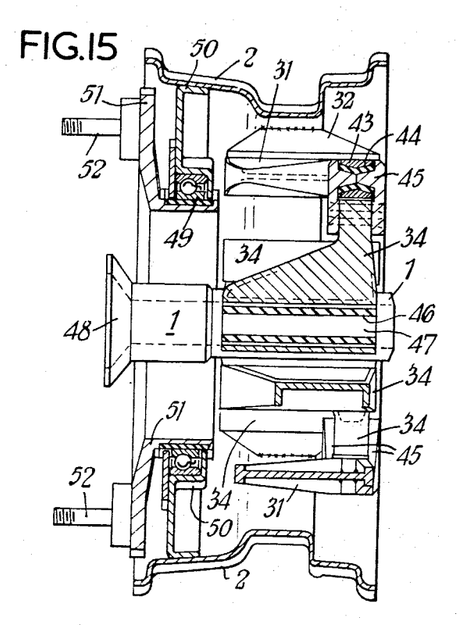
FIG. 15 is a section on the line 15—15 of FIG. 14.

A practical form of jointed compliant wheel embodiment will now be described with reference to FIGS. 14 and 15 in which FIG. 14 represents a side view looking at the outer face of the wheel and FIG. 15 is a sectional view on a line 15—15 of FIG. 14 looking radially towards hub.

An orthodox road tire rim 2 is provided with four bush male bearing centers 38 carried on supports 32 fixed to inner well surface of the rim, the male centers being bonded to semicircular rubber bushes 42 which in turn are bonded to inner tubular faces provided at the ends 40 of outer spoke members 31. The spoke members 31 are provided at their other ends with bored conical surfaces to form outer bush housings 43, the surfaces tapering inwards from either side in which resilient rubber sleeves 44 are trapped by means of externally conical cooperating projections on sideplate halves 45 which are clamped together and secured to the four inner spoke members 34 to form the four knuckle joints 33. At the inner or hub ends of spoke members 34 are formed the outer housings of the four bushes (according to FIG. 8) by which they are joined through the bonded rubber sleeves 46 and male hub projection 47 to the hub 1 which is splined and provided with register 48 for half-shaft mounting between a half-shaft register and an outboard half-shaft nut. A wheel structure resilient in all radial directions but highly resistant to transverse force components is thereby obtained, having a deflection range approaching 30 percent of the nominal rim diameter or 35 percent of the rim well diameter to which spoke supports 32 are fixed.

A ball bearing 49 housed in a diaphragm plate 50 is secured to the inner face of the rim 2, so that the bearing 49 is coaxial with the rim. Cooperating with the bearing 49 is a bearing hanger 51. Any deflection in the plane perpendicular to the hub axis of the hanger 51 is therefore a precise function of rim deflection. The hanger 51 is to be supported relative to a vehicle structure by bearing supports 52.

The supporting components of bearing 49 are of light construction and may well be so without poor load distribution in the bearing if the usual precautions are observed. Nevertheless, to ensure good load distribution and to make wheel changing easier, the hanger 51 is not a tight fit in the bearing bore but the cylindrical surface in said bore is recessed and into this recess is bonded a ring of flat resilient material such as rubber on which the bearing bore is fitted. Further, the wheel is registered transversely by the half-shaft and it is undesirable that it should be registered additionally elsewhere to avoid conflict from the buildup of manufacturing tolerances. Bearing 41 sustains only journal loads, and this also is a desirable position. If secondary registration is required for reasons unknown, some compliance should be introduced in the preferred design.

Having given various examples of construction with which, separately or in combination, the wheel part of the invention may be put into effect, the cooperating control means essential to their proper working and practical advantage in automotive or like applications will be considered. More particularly, the following designs are such as to provide an effective compromise between exploiting the full diametral range, maintaining castor provisions, damping oscillation nd limiting the sudden onset of unpredictable imbalance.

The control means to be described with reference to the drawings are based on the application of a concentric rim part or a part of rim itself, that is to say a disc, partial disc, spider, diaphragm or like device revolving coaxially with the rim axis and provided with bearing means within or for use in cooperation with this coaxial device. Said bearing means relates said device to a fixed part or parts of a vehicle through the medium of a control element or elements. In the simplest form, a control element consists of a link or arm one end of which is provided with or securely fixed to one part of said bearing, while the opposite end of said link or arm is hinged to a point on the vehicle structure, thereby constraining the rim to possible deflection through a curved path which is generally vertical in relation to the normal vehicle position.

Figure 3:
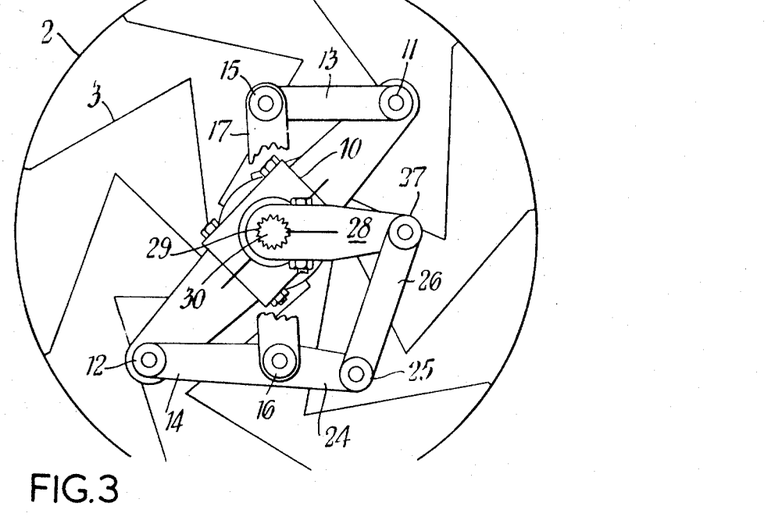
FIGS. 3 and 4 show a motion-controlling mechanism applied to the wheel of FIG. 1 in its unstressed state and in its stressed state, respectively.
Figure 4:
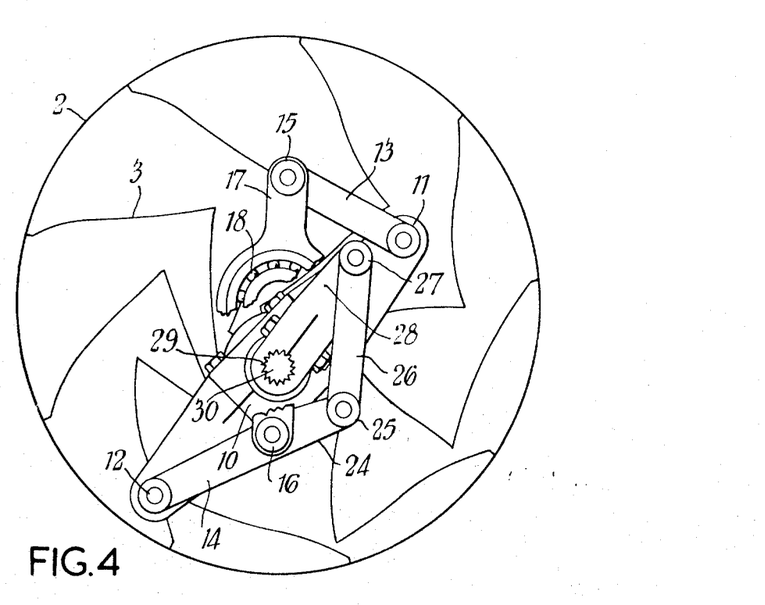
Figure 5:
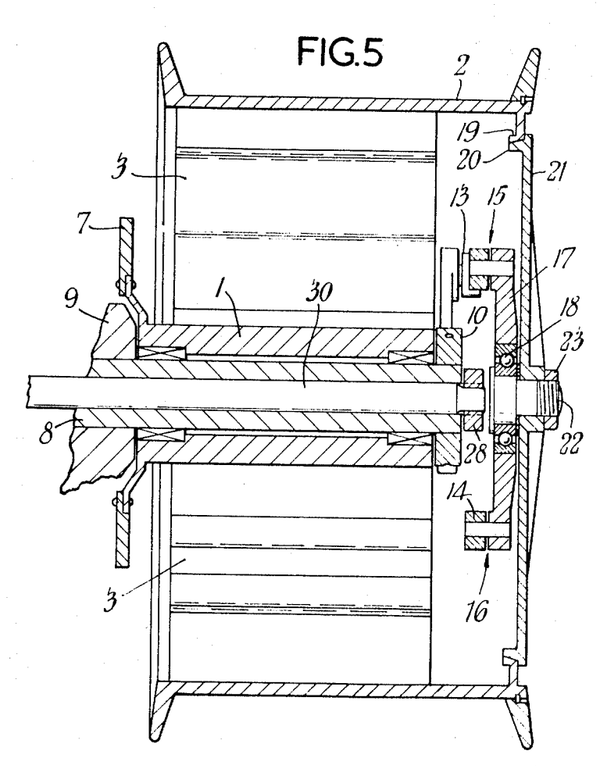
FIG. 5 is an axial cross section of the wheel and mechanism of FIGS. 3 and 4.

Referring again to the drawings, FIG. 3 is a diagrammatic view of a wheel, with a motion control device, in an undeflected state, FIG. 4 illustrates the same in a deflected condition, and FIG. 5 is a section through the vertical diameter of such a wheel when undeflected. The motion control means in all of these figures is a so-called Watts linkage mechanism.

FIGS. 3 and 4 will be understood in relation to FIG. 5 which will now be described.

In FIG. 5 a wheel hub carrying a brake disc 7 is supported on two bearings by a hub spindle 8 one end of which is mounted in a hub carrier 9. The backplate 10 of a linear-motion assembly known as a Watts linkage is clamped on the outward end of the hub spindle 8 and is provided with bearings 11 and 12 from which hangs two radius arms 13 and 14 provided with bearings 15 and 16 supporting a linear-motion link 17. At the center of the link 17 a bearing 18 is provided to define the path of rim motion relative to the hub 1. Spokes 3 of resilient sheet material are fixed along their innermost edges to the hub and along their outermost edges to the rim 2. An inward-facing flange 19 on the rim 2 cooperates with a peripheral spigot 20 of a disc 21 which is secured coaxially to bearing 18 by means of a locking spindle 22 and a nut 23. Radius arm 14 is provided with an extension 24 and bearing 25 to which is attached one end of a link 26. The other end of the link 26 is supported by a bearing 27 on the outer end of an arm 28, the inner end of the arm 22 being clamped to splines 29 on a spindle 30. The arrangement is such that deflections of the wheel rim 2 are transmitted through disc 21 and bearing 18 to the linear motion link 17 which further transmits the motion to arm 28 mounted on spindle 30, thereby imparting to the spindle a rotary motion proportional to rim movements.

In the case of the embodiment of FIGS. 4 to 6, the deflection shown is about 14 percent of the rim diameter, and this corresponds to a total range of 28 percent taking into account the possible movement in the opposite direction. The extent to which the nominally straight spoke portions deviate from a mean straight line with the illustrated deflection ranges from about 2 percent up to a maximum of 6 percent under static conditions.

At the point where said spindle 30 projects inwards of the hub carrier 9 vehicle restraint is applied by conventional methods such as a normal suspension spring. Accordingly, said restraint acts through the spindle and the linkage to the rim, and the restraining force determines the extent to which rim is deflected. It may be desired to allocate, for example, 70 percent of wheel diametral deflection range to bump provision and remaining 30 percent to recoil provision, or some other bump-recoil ratio may be preferred within the obvious limits of 100 percent for the sum. The range allocation is therefore determined by the suspension spring.

The spindle angle is a function of rim deflection. It thus follows that rim oscillations must produce shaft angular oscillations, and that by damping the spindle where it emerges through the hub carrier through an arm or other conventional means full damping control may conveniently be imposed on the rim. In like manner antiroll and other devices may be applied. The problems of roll and oscillation control are thereby eliminated.

The configuration described is particularly appropriate to steerable wheels and wheels that are not driven for purposes of propulsion. In wheels that are driven the load shaft would conflict with direct-drive requirements, and although indirect drives are possible they are not preferred on economic grounds. Nevertheless, direct drive is a fully economic proposition if the load shaft and Watts linkage age provisions are removed, the hub is mounted direct onto the half-shaft or like by which it is propelled, and the wheel deflection path is defined by external means, such as a trailing link outboard of the wheel cooperating with bearing means 18 in a wheel disc. The deflection path will then be a curve of radius determined by link center length. The outboard link or arm would then be coupled with restraining means, damping device and like as required. Such an arrangement would be fully acceptable technically for rear wheels; the arm would lie well above normal curb height and within the usual width provisions of bodywork, could be hinged to facilitate wheel interchange, and is capable of attractive stylistic treatment. Such a system is illustrated in FIG. 16 where a leading link is pivoted to the vehicle chassis, for example through a torsion bar.

A further alternative favorable to driven wheel applications can be constructed from the wheel of FIGS. 14 and 15.

The hub 1 of the suspension wheel is mounted directly on the half-shaft by which it is driven and supported about an axis which is defined by fixed bearings in which the half-shaft revolves. The hanger and rim are restrained to follow the required deflection path according to the manner in which it is hinged or pivoted to vehicle structure; such means may include a hinged arm, parallel links or an upper link and lower link disposed in Watts formation to give a straight line.

whether inboard or outboard control elements are used, all lateral thrusts are transmitted through the wheel spoke system and half-shaft bearings. Therefore, large diameter inboard or small diameter outboard bearings sustain only journal loads due to deadweight.

A Watts linkage control related to the wheel of FIGS. 14 and 15 is illustrated in FIG. 17. Upper and lower links 53 and 54 are pivotally mounted to the supports 52 on the hanger 50. The upper link 53 is pivotally mounted to the vehicle chassis whilst the lower link 54 is splined to receive a torsion bar 55 providing the suspension springing and designed to maintain the coaxial static position of the rim and hub for a predetermined load, although in the figure a recoil condition is illustrated. A shock absorber 56 is also splined to the torsion bar 55, although other damping arrangements are feasible and may be coupled to the upper link. Antiroll means may also be provided, for example joined to the upper link. The upper link could also be associated with a torsion bar.

Alternatively, helical springs open or strutted, may act downwards on the hanger 50. Such springs may, conventionally, incorporate damping means.

As is shown in FIG. 17, conventional rubber stops may be added to limit wheel deflection.

The Watts linkage is well-known, although its use in the configurations described and its application to and within a wheel for suspension means is thought to be new. Another linear motion device which may be used in adapted or derived form is a hypocycloid gear.

Figure 18:
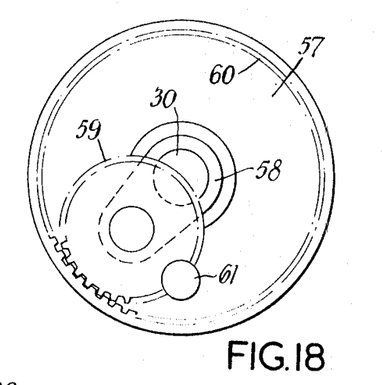
FIGS. 18 to 21 show hypocycloid control means.

Referring to FIG. 18, as applied for example to the wheel of FIG. 5, the backplate 51 of a hypocycloid unit is mounted on the fixed hub carrier 8 in place of the Watts linkage. In this case, the spindle 30 projects through the hypocycloid backplate and carries a crank arm 58 of radius $x$. Rotatable freely on the crank the flange is a pinion 59 of pitch circle diameter (P.C.D.) $2x$ in mesh with an internal gear 60 of P.C.D. $4x$ carried concentrically on the backplate A stub shaft 61 is fixed to the pinion in such a position that its axis is in line with pinion axis and simultaneously with the pinion P.C.D. This stubshaft 61 is related directly through bearing means with the disc, illustrate or like of the wheel. As the crank 58 is revolved through half a turn, the pinion rolls round the inner gear teeth also through 180°, and the stubshaft 61 describes a straight line.

Figure 19:
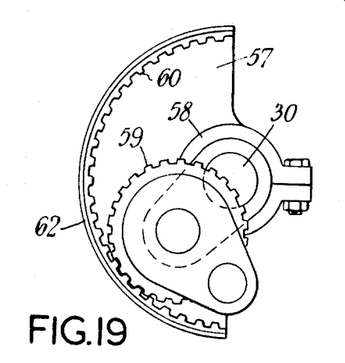

Because internal gears are expensive, teeth require lubrication maintenance, and only half the gear 60 and backplate 57 are useful, the device may be simplified as shown in FIG. 19.

Figure 20:
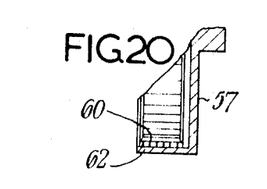

Referring to FIGS. 19 and 20, a reduced backplate 57 supports a flange 62 through an arc of about 180° as shown. A length of cogged belt 60 is cemented onto the inside surface of the flange to provide meshable teeth thereon. The pinion may be a cogged belt pulley, or a plain pulley having a length of cogged belt cemented therearound. Cogged belting, particularly that made of neoprene reinforced with glass fiber and faced with nylon, is tough, light, inexpensive, weather resistant and requires no lubrication. The sectional detail of FIG. 20 illustrates the position in which the belt is fixed. This drawing does not illustrate the crank arm.

Where minimum device width is essential or the duty exceeds that of a cogged belt of acceptable width, the flange may be provided with sprocket teeth, with a length of roller chain wrapped round and secured to a plane wheel, or a length of chain clinched in a groove and secured at its ends may be fitted round the flange and a planetary sprocket pinion used.

In cases where there are greater restrictions on device height than on width, the above hypocycloid derivation may be taken a stage further with advantage. The sector described by the flange may be much reduced, the various center distances substantially increased, and a lever used instead of a planetary pinion, the lever having cogging means over an arc at one end in mesh with teeth around the flange.

Figure 21:
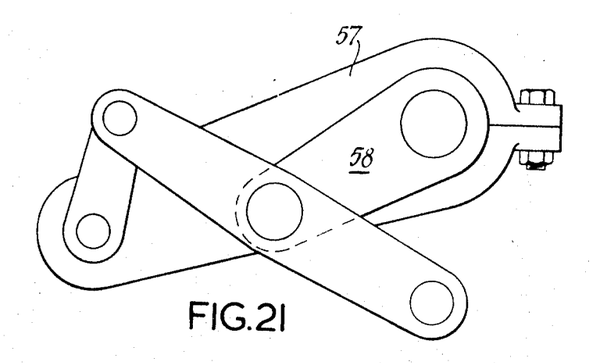

A particularly favorable derivation is where the gear system is transposed to a lever system throughout as shown in FIG. 21, where technical needs do not require exact linearity. A toggle link acts as fulcrum in place of teeth. Linearity can in fact be very good, and fully within most castor tolerances.

It will be seen that the invention can provide a suspension system in which, if the wheel hub be in a fixed position the motion control means can be so arranged that the rim of the wheel may be made to exert a pressure in a given direction, such as for example to the friction surface of a variable ratio torque converter. Alternatively, the rim may have gear teeth formed thereon. Such a system may be used, inter alia, to eliminated backlash in servomechanisms or the like. Sprocket and belt drives may similarly be tensioned. A rim connected by spring spokes to a hub as described, may be mounted in overhung fashion by said rim or hub from the shaft of a driving or driven machine to both tension the drive and cushion cyclic irregularities. As a coupling device, the wheel by itself resists axial deflections but has torsional and radial resilience and mechanical applications are known where these characteristics are specific requirements.

I claim:

1. A suspension system comprising:
a support;
a wheel hub rotatable relative to said support;
a wheel rim;
torque transmissible compliant means joining said hub and rim to permit relative radial movement of said hub and rim;
motion control means connected between said support and said rim to constrain said relative movement to a predetermined path relative to said support; and
bearing means rotationally coupling said control means to said rim to permit of hub and rim rotation simultaneously with rim constraint to said predetermined path.

2. A system as claimed in claim 1, wherein said motion control means are constructed to define an arcuate path.

3. A system as claimed in claim 2, wherein said path is of substantially infinite radius.

4. A system as claimed in claim 2, wherein said control means comprises a member pivotally mounted about spaced axes relative, respectively, to said support and to said bearing means.

5. A system as claimed in claim 3, wherein said control means comprises two members pivotally mounted relative to said bearing means at opposite sides of said hub and each of said members being also pivotally mounted relative to said support to provide a Watts linkage.

6. A system as claimed in claim 1, wherein said control means is a mechanism mounted within the confines of said rim.

7. A system as claimed in claim 1, wherein said control means is a Watts linkage.

8. A system as claimed in claim 1, wherein said control means is a cycloid mechanism.

9. A system as claimed in claim 8, wherein said mechanism is hypocycloid.

10. A system as claimed in claim 9, wherein the mechanism comprises an internally toothed member with a toothed extent of approximately 180° about said hub.

11. A system as claimed in claim 8, wherein said mechanism is a linkage substantially equivalent to a cycloid gear mechanism.

12. A system as claimed in claim 1, and comprising suspension spring means coupled to said rim via bearing means to bypass said hub.

13. A system as claimed in claim 12 and comprising suspension-damping means coupled to said rim via said bearing means.

14. A system as claimed in claim 12, wherein said spring means comprises a torsion bar.

15. A system as claimed in claim 1, wherein said compliant means comprises spoke structures each having portions of sheet material the width dimension of which extends transversely of said hub and rim and which portions are connected by an angled junction also extending transversely of said hub and rim.

16. A system as claimed in claim 15, wherein said structures are each of V-shaped sheet material.

17. A system as claimed in claim 15, wherein said structures are each of sheet material providing a first portion which extends away from said hub and a further portion which is resilient lengthwise and connected chordwise relative to rim, said first portion being joined, at an angle, to said further portion.

18. A system as claimed in claim 17, wherein said further portion includes a loop to provide resilience lengthwise.

19. A system as claimed in claim 17, wherein said further portion has two parts mutually offset chordwise to enable said structures to be interleaved.

20. A system according to claim 1, wherein said compliant means comprise spoke structures each having two spoke portions hinged together and relative to said hub and rim.

21. A system as claimed in claim 20, wherein said spoke structures form two sets having substantially the same arrangement between said hub and rim when considered in respective directions of rotation.

22. A system as claimed in claim 20, wherein at least one pair of said structures is joined by a link.

23. A system as claimed in claim 22, wherein said link is resilient.

24. A system as claimed in claim 19, wherein each spoke structure has a hinge with a resilient pivoting action.

25. A system as claimed in claim 24, wherein said hinge has a make part within a female part and resilient material secured between said parts.

26. A system as claimed in claim 25, wherein said resilient material is bonded to said parts.

27. A system as claimed in claim 24, wherein hinges with a resilient pivoting action join said spoke portions to each other and to said rim and hub.

28. A system as claimed in claim 20, wherein said spoke portions are of substantially L-form.

29. A system as claimed in claim 28, wherein narrower regions of said spoke portions are hinged together and broader regions of said spoke portions are hinged to said hub and rim.

30. A vehicle comprising:
a chassis;
a wheel hub;
first bearing means by which said hub is rotatably mounted to said chassis;
a wheel rim;
torque transmissible compliant means joining said hub and rim for relative radial movement and simultaneous rotation;
second bearing means connected to said rim; and
rim control means rotationally coupling said rim to said chassis via said bearing means to bypass said hub and define a substantially vertical path of movement for said rim relative to said chassis despite simultaneous rotation of said hub and rim relative to said first bearing means.